No. 719,579. PATENTED FEB. 3, 1903.
D. J. FRIESEN.
TWITCH.
APPLICATION FILED JULY 31, 1902.
NO MODEL.
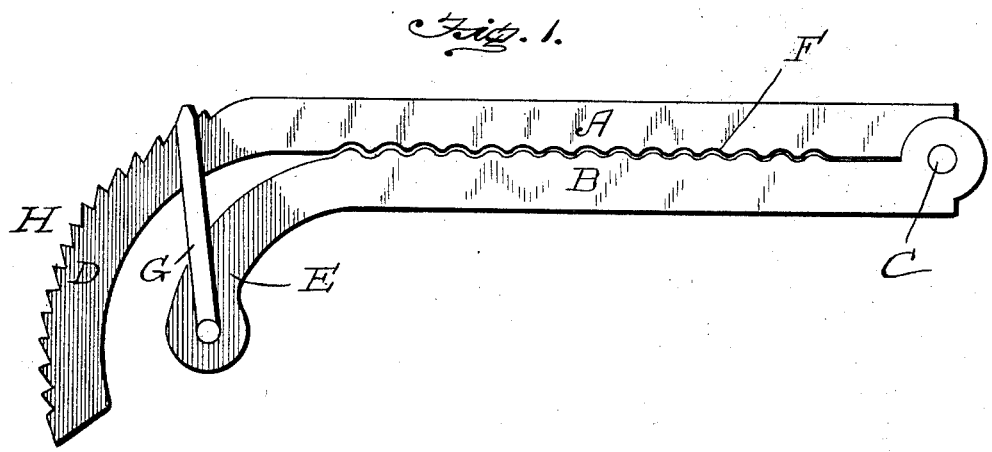
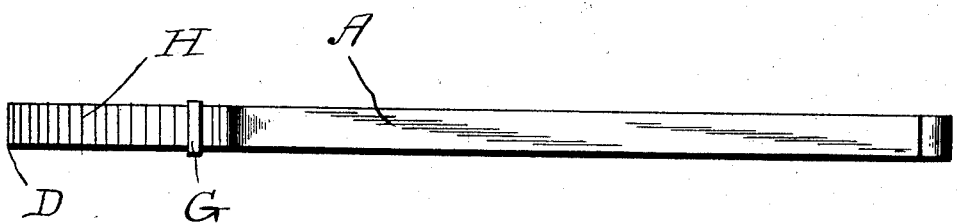
Inventor
D. J. Friesen

UNITED STATES PATENT OFFICE.

DIEDRICH J. FRIESEN, OF MOUNDRIDGE, KANSAS.

TWITCH.

SPECIFICATION forming part of Letters Patent No. 719,579, dated February 3, 1903.

Application filed July 31, 1902. Serial No. 117,886. (No model.)

*To all whom it may concern:*

Be it known that I, DIEDRICH J. FRIESEN, a citizen of the United States, residing at Moundridge, in the county of McPherson and State of Kansas, have invented certain new and useful Improvements in Twitches; and I do declare the following to be a full, clear, and exact description of the invention, such as will enable others skilled in the art to which it appertains to make and use the same.

The invention relates to twitches.

The object of the invention is to provide a device of this character which shall be simple of construction, efficient in use, and comparatively inexpensive of production and which may be easily and conveniently applied to the upper lip of a refractory horse or other animal to hold and subdue him in the act of shoeing or operating upon him.

With the above and other objects in view, which will readily appear as the nature of the invention is better understood, said invention consists in certain novel features of construction and combination and arrangement of parts, which will be hereinafter fully described and claimed, and illustrated in the accompanying drawings, in which—

Figure 1 is a side view of the invention. Fig. 2 is a top plan view.

The invention comprises two levers A and B, pivoted at C and extending parallel for a portion of their length, and thence curved downwardly, as shown at D and E. The inner or contiguous surfaces of the levers A and B or their parallel sides are serrated or roughened, as shown at F, so as to obtain a firm hold and prevent slipping when applied to the upper lip of the animal.

To hold the levers A and B, which practically constitute clamping-jaws, securely in position when applied, I provide simple means, which consists of a bail G, hinged to the downwardly-curved end E and adapted to swing up over the downwardly-curved end D and engage rack-teeth H, formed on its outer edge, and thus hold the jaws or levers A and B with any desired pressure upon the animal's lip.

When it is desired to release the jaws or levers A and B from the animal's lip, the ends D and E are compressed slightly together to free the bight of the bail from the teeth H, thus permitting the bail to freely disengage the tooth with which it was engaged and drop to a vertical position pendent from the end D.

From the foregoing description, taken in connection with the accompanying drawings, it is thought that the construction, operation, and advantages of my improved twitch will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. A twitch, comprising two bars pivoted together and extending parallel for a portion of their length and terminating in spaced-apart curved ends, and a bail pivoted to one curved end and adapted to engage the other curved end, substantially as set forth.

2. A twitch, comprising two bars pivoted together and extending parallel for a portion of their length and terminating in spaced-apart curved ends and having serrated or roughened opposing faces, and a bail pivoted to one curved end and adapted to engage the other curved end, substantially as described.

3. A twitch, comprising two bars pivoted together and extending parallel for a portion of their length and terminating in spaced-apart curved ends, one of which is provided with ratchet-teeth, said bars having serrated or roughened opposing faces, and a bail pivoted to one curved end and adapted to engage the ratchet-teeth of the other curved end, substantially as described.

In testimony whereof I have hereunto set my hand in presence of two subscribing witnesses.

DIEDRICH J. FRIESEN.

Witnesses:
A. RINGWALD,
ADDIE RINGWALD.